June 8, 1954

L. P. FRIEDER ET AL
REGULATING AND CONTROL APPARATUS
FOR LOAD-SUPPORTING MEANS 2,680,577

Filed July 12, 1949

INVENTORS.
LEONARD P. FRIEDER
WALTER S. FINKEN

BY Robert S. Dunham

ATTORNEY.

June 8, 1954

L. P. FRIEDER ET AL

2,680,577

REGULATING AND CONTROL APPARATUS FOR LOAD-SUPPORTING MEANS

Filed July 12, 1949

INVENTORS.
LEONARD P. FRIEDER
WALTER S. FINKEN

BY Robert S. Dunham

ATTORNEY.

June 8, 1954

L. P. FRIEDER ET AL 2,680,577

REGULATING AND CONTROL APPARATUS
FOR LOAD-SUPPORTING MEANS

Filed July 12, 1949

INVENTORS.
LEONARD P. FRIEDER
WALTER S. FINKEN

BY Robert S. Dunham

ATTORNEY.

June 8, 1954

L. P. FRIEDER ET AL
REGULATING AND CONTROL APPARATUS
FOR LOAD-SUPPORTING MEANS 2,680,577

Filed July 12, 1949

INVENTORS.
LEONARD P. FRIEDER
WALTER S. FINKEN

BY Robert S. Dunham

ATTORNEY.

FIG. 16  FIG. 17  FIG. 18  FIG. 19

INVENTORS.
LEONARD P. FRIEDER
WALTER S. FINKEN
BY Robert S. Dunham
ATTORNEY.

June 8, 1954  L. P. FRIEDER ET AL  2,680,577
REGULATING AND CONTROL APPARATUS
FOR LOAD-SUPPORTING MEANS
Filed July 12, 1949  7 Sheets-Sheet 7

INVENTORS.
LEONARD P. FRIEDER
WALTER S. FINKEN

BY Robert S. Dunham
ATTORNEY.

Patented June 8, 1954

2,680,577

UNITED STATES PATENT OFFICE 2,680,577

REGULATING AND CONTROL APPARATUS FOR LOAD-SUPPORTING MEANS

Leonard P. Frieder, Great Neck, and Walter S. Finken, Brooklyn, N. Y., assignors, by mesne assignments, to Reconstruction Finance Corporation, Philadelphia, Pa., a corporation of the United States Application July 12, 1949, Serial No. 104,368

26 Claims. (Cl. 242—149)

This invention relates to regulating and control apparatus for load-supporting means and more particularly to apparatus wherein a load is to be connected to a load-supporting or equivalent instrumentality by a cord, cable or other line, a principal feature of the invention being directed to such apparatus wherein the loaded line is to be payed out or extended in a controlled manner while under the tension of load-supporting or like force. Although the devices herein disclosed are useful under a variety of circumstances, the invention is primarily concerned with the support or retardation of loaded lines extending from aerially disposed objects such as balloons, parachutes, aircraft and the like. An important example of circumstances wherein the apparatus of the invention is particularly useful, is presented by balloon-type equipment for aerial sounding, i. e. arrangements for carrying meteorological instruments by balloon for measuring conditions of pressure, temperature, humidity and other atmospheric effects. Such apparatus is usually carried aloft by a balloon of moderate dimensions, the instruments being arranged in a suitable assembly with appropriate means for recording the readings, and more usually, for transmitting the readings by radio to a ground station. Similar apparatus may be used for other purposes, indeed under any circumstances where automatic observation and signaling is required in aerial regions above the ground.

By way of more specific example, it has been found desirable to have the instruments suspended from the balloon by a relatively long load line, it being understood that an important reason for such arrangement of the load and balloon is to prevent certain interfering or disturbing effects on radio transmission or other radio signaling from the load when the balloon is close to the latter. Equipment of this sort, however, is commonly released at localities where a long load line is highly objectionable. Surrounding trees, buildings or like objects present a hazard to a long line from a slowly rising balloon in that the line or supported assembly of instruments is likely to be snagged or injured by such objects as the balloon rises upwardly and always somewhat laterally by reason of wind currents. Similar difficulties arise in the release of balloon-supported equipment from shipboard, where it is ordinarily impossible to release the balloon at any great distance from masts, funnels, radio antennas and the like which may snag a long line or its load or may damage the delicate instruments of the load if the latter strikes the stationary objects.

Accordingly it is desirable to arrange the supporting apparatus so that at the time of release the load is held quite close to the balloon, but during ascent of the balloon, the load line is payed out slowly from a supply so that by the time the equipment reaches a height appropriate for initiation of signaling, the balloon or like support is positioned sufficiently remote from the load. A chief object of the present invention is therefore to provide apparatus adapted for use under such circumstances, to effectuate a retarded extension of the line in a novel and yet fully controlled manner, over a period of time sufficient to permit the aerially borne assembly to rise clear of terrestrial interference. A like object of the invention is to provide new and improved apparatus of the character stated, which is light in weight, simple and inexpensive to manufacture, and yet highly efficient in affording a retarded advance of the load line while maintaining a smooth, even support and while avoiding any possibility of rupture or injury to such line, or damage to associated devices.

A still further object is the provision of line-advancing apparatus of improved character, which is adapted or adjusted to handle lines of various sizes and characteristics, as well as to provide retarded advance at any selected rate, and likewise to coordinate the retarding effect with the selected magnitude of the load. Other objects are to provide novel load-receding arrangements, of simple and effective structure, requiring no delicate or complex parts and involving no escapements, gear trains or like instrumentalities of costly or unduly heavy or mechanically delicate character.

Other objects are to provide line-retarding apparatus which may be easily adjusted or set and which is very light in weight (adding almost no burden to the supporting balloon), yet which is rugged and capable of manufacture at relatively small cost. The cost of apparatus of this type is usually important, since the balloon and its equipment are often irretrievably lost at the end of the signaling flight; indeed such consequence is commonly contemplated, i. e. for radiosonde apparatus that is used once and not recovered.

Yet another object is to provide improved line-retarding means of the character described, which perform automatic or other special controlling functions in the course of line extension, as by modifying the rate of line advance in a progressive or other desired manner, one example being a situation where the first part of the line must be discharged very slowly, while the balance (as in the case of a rapidly rising balloon) should be payed out at a faster rate.

Additional objects are to afford novel and cooperative combinations of the character described, viz. for supporting loads from aerially disposed objects, wherein supplemental control or like operations are achieved and facilitated. A more specific object is to provide a novel arrangement for connection with a balloon, to provide closure for the latter and attachment of the load while preferably incorporating a regulated retardation of the load line. Another specific object is to provide means accomplishing supplemental automatic control, e. g. of an electrical character, in cooperation with the supported assembly, as for release of other or supplemental load-supporting means or for signaling purposes or the like. Another and more general object is to provide improved line-attaching means for load-carrying devices, adapted to reduce or minimize undue shock, tension and like effects incidental to the initial or subsequent functioning of the load-supporting device.

To these and other ends certain specific embodiments of the invention are described below and shown in the accompanying drawings, by way of examples which are believed to illustrate the significant principles and features of improvement.

Referring to the drawings:

Fig. 9 is a diagram illustrating certain force relationships in the gripping members of Figs. 1 to 6;

Fig. 10 is a fragmentary perspective view of a modified structure providing a varying rate of line advance;

Fig. 10-A is a section on line 10-A—10-A of Fig. 10;

While a variety of other uses are contemplated, it will be assumed for purposes of illustration, that the device of Figs. 1 to 6, inclusive, is intended for incorporation in balloon-carried so-called radiosonde sounding equipment, e. g. apparatus. Such apparatus may comprise, as the load, an assembly of instruments designed to make meteorological observations and to report the same automatically by radio as the instruments are carried and supported aloft by a balloon of suitable size, usually small, to reach the desired altitude. As explained, it is desirable to suspend the load very close to the balloon when the assembly is first released, but to have the load line pay out gradually so that when the apparatus reaches a selected height, say, one thousand feet or so, the load has dropped to a considerable distance below the balloon, for instance 50 to 100 feet or more. The rate of retardation of line pay out must be sufficiently slow as to permit no great elongation until after the assembly has cleared adjacent terrestrial objects, such as trees, buildings, cliffs, ship masts and the like.

Figure 8:
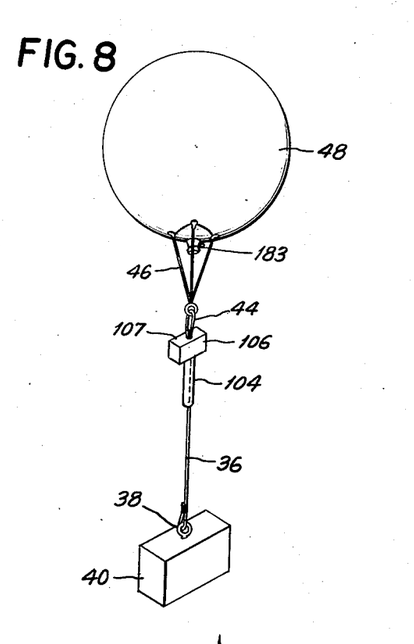
Fig. 8 is a schematic, perspective view showing the device of Figs. 1 to 7 in combination with a balloon and supported load.

The device of Figs. 1 to 6 comprises a frame 30 consisting of spaced arms 31, 32 respectively providing bearings for a freely rotatable reel 34 upon which is wound a supply 35 of the cord or line 36, which extends, through the parts presently to be described, to a lower locality 36a and thence to a point of attachment 38 (Fig. 8) to the load as diagrammatically indicated at 40. The upper parts of the arms 31, 32 are bent over and secured together, as by a grommet 41, thereby affording an eye 42 to receive a loop 44 of suitable cord or the like by which the device may be fastened to suitable supporting connections 46 at the underside of the balloon 48, again as shown in Fig. 8.

Carried beneath the frame 30 (Figs. 1 to 6) a pair of parallel clamping members generally designated 50, 51 are arranged, in cooperation with other instrumentalities, to effect a retarding, frictional engagement with the line 36. Like the other member as described below, the member 51 comprises a channel portion 52 having a face or web 53 disposed to abut the cord and having an elongated tail or extension 54. The latter is conveniently secured, as by means of a horizontal tab 55, to the lower bend 56 of the frame 30, which is conveniently made of a single metal strip bent to provide the portions 56, 31 and 32. The tab 55 and frame part 56 can be united by a grommet 58, upset or deformed into clamping engagement of the parts, and providing an opening 59 through which the cord 36 may be drawn from the reel.

Figures 1, 2:
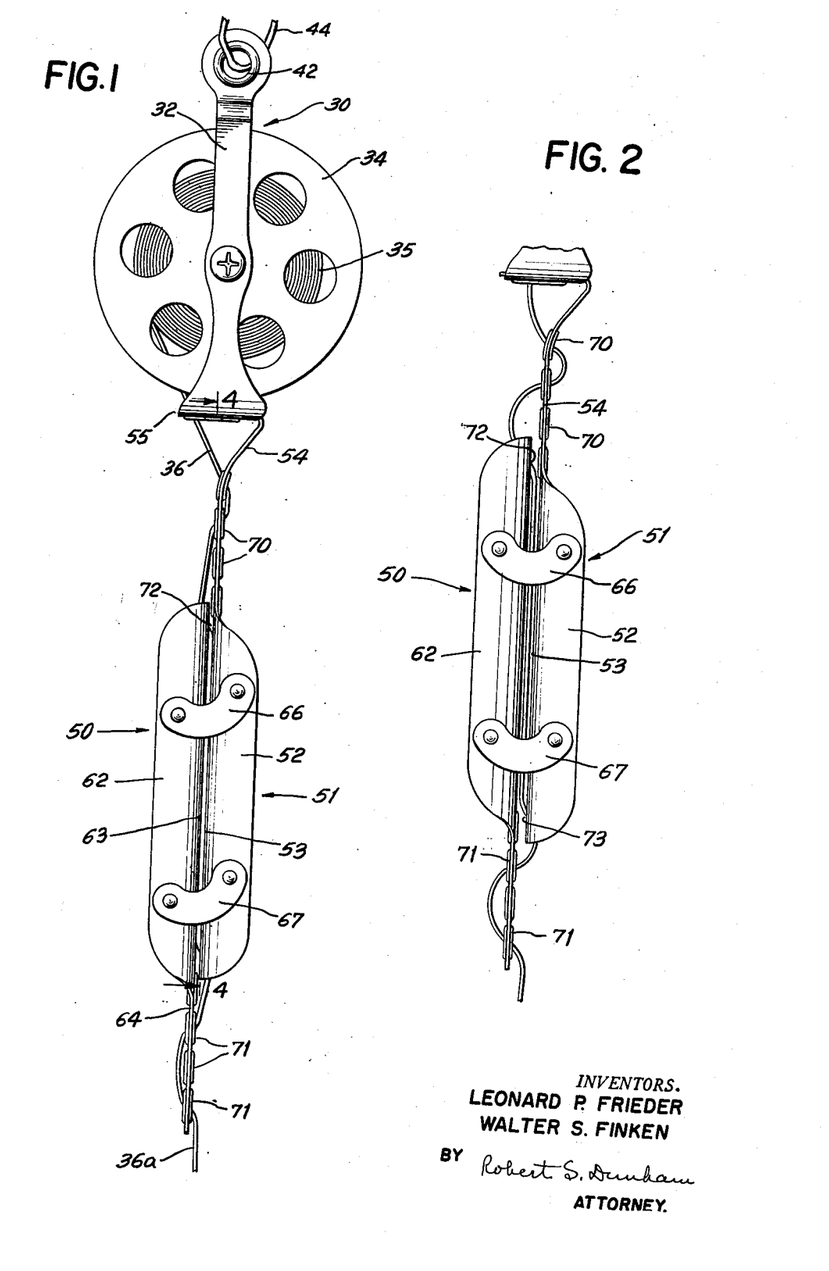
Fig. 1 is a side elevation of one form of the apparatus for providing a retarded extension of a load line.
Fig. 2 is a like view of a portion of the device of Fig. 1 showing certain parts in a relaxed or opened position.

The member 50 comprises a channel portion 62 having a cord-abutting face or web 63, like the corresponding structure of the member 51. The member 50 also has a tail or extended portion 64 similar to the portion 54, the two members being disposed so that the parts 54, 64 extend in vertically opposite directions. The channel portions 52, 62 of the two members are arranged with their surfaces 53, 63 in facing, parallel relation, and are movably connected by appropriate linkage, such as the two sets of links 66, 67 each of which is pivoted, at its respective ends, on the sides of the channel portions 62, 52. By virtue of the described linkage, the members 50, 51 are maintained in a parallel relationship and may move toward and away from each other while while keeping such relationship, so as to grip or release a cord passing lengthwise between them, Figs. 1, 3 and 6 showing the parts in closely engaged position, and Fig. 2 illustrating them in open or released condition.

It will be seen that the members 50, 51 thus provide a pair of elongated, parallel surfaces 53, 63 between which the cord 36 passes and which are adapted to be urged toward each other in gripping relationship to the cord between. While other types of construction may be employed, these members may be inexpensively made of sheet metal strips having elongated side portions bent to constitute the channel parts, a further portion of each strip constituting the tail 54 or 64.

Means are also provided, not only for imparting force to the separable members 50, 51 to bring them together in frictional engagement upon the cord, but preferably also to afford co-operating frictional engagement with the cord to share the load-supporting and retarding action. A particularly convenient arrangement for the described purposes is constituted by a series of grommeted holes in each of the tail portions 54, 64, for example, a vertical array of spaced holes 70 in the upper tail portion 54 and a like array of holes 71 in the tail portion 64. In the device shown, there are four holes in each set but it will be understood that different numbers of such holes or like apertures may be provided, in accordance with the requirements of adjustability and of the extent of snubbing effect desired in a particular apparatus. At the toe or opposite end of each of the members 50, 51, there are provided in the web portions 63 grommeted holes respectively designated 72 and 73, which serve to cooperate with the other holes particularly to guide the cord down between the faces 53, 63 in proper alignment, preventing fouling or snagging of the cord by the linkage 66, 67 or otherwise.

Figures 3, 4, 5, 6:
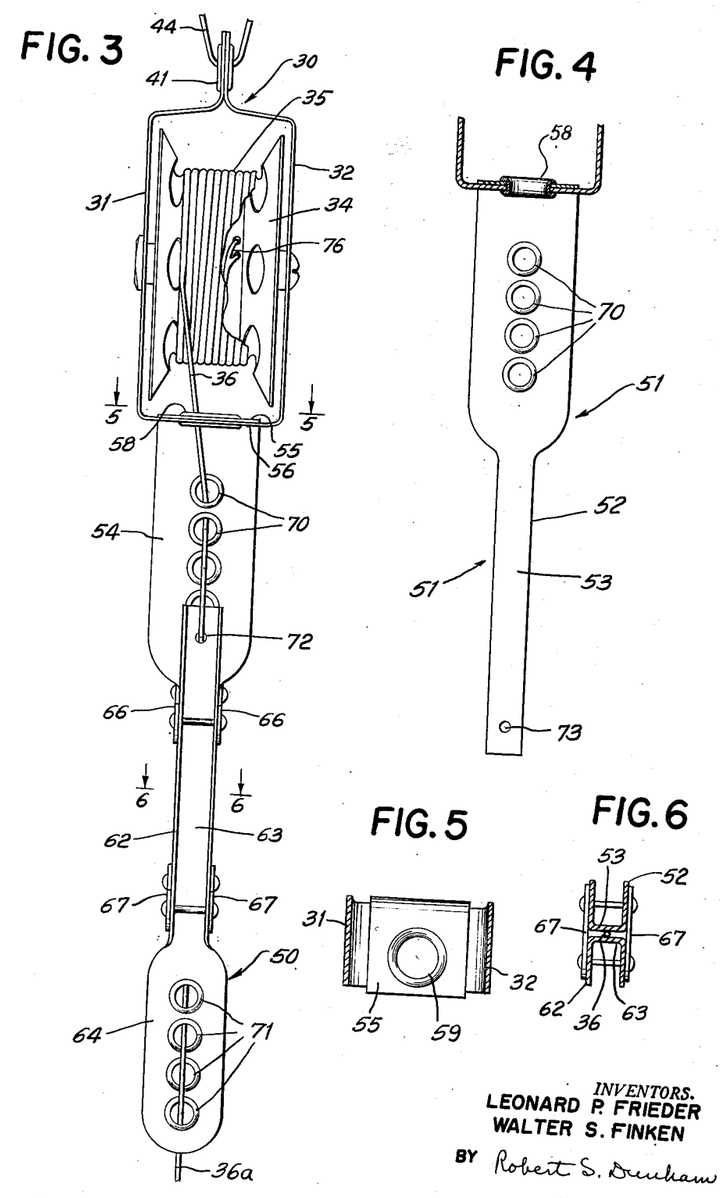
Fig. 3 is a front elevation of the device of Figs. 1 and 2.
Fig. 4 is a fragmentary section on the line 4—4 of Fig. 1, with the cord removed.
Figs. 5 and 6 are respectively sections on lines 5—5 and 6—6 of Fig. 3.

For operation, the reel 34 is provided with a sufficient winding of cord to furnish the desired ultimate length of line between the balloon and the load, the inner end of the cord being secured to the shaft or core of the reel as shown at 76 in the broken-away part of Fig. 3. From the reel 34, the cord is threaded through the grommeted hole 58, and preferably back-and-forth through two or more of the grommeted holes 70, thence through the hole 72 from the outside to the inner surface of the web 63 and down between the webs or faces 53, 63, as shown. At the lower end of the gripping surfaces the cord runs back through the hole 73 and then through one or more of the lower set of holes 71, to pass freely below the device, being connected at its remote end 38 to the load 40 as shown in Fig. 8.

Thus it will be seen that the cord, discharged from the freely rotatable reel 34, is guided down between the channel members 52, 62, and specifically between their opposed faces 53, 63, and then through means associated with one of the members (i. e. the member 50, which is not attached to the upper frame 30) which engages the cord and serves to apply gripping force to the members, from the load-force under which the cord is tensioned in operation. The last-mentioned means, as explained, is constituted by the apertures 71 in the tail piece 64 of the member 50.

Assuming that a balloon is appropriately attached to the loop 44 and a load to the lower end 36a of the cord, i. e. as indicated in Fig. 8, and that substantially all of the cord is wound on the reel 34, with at most a very short length between the end of the device 50 and the load, the assembly may be released to travel upward under the lifting action of the balloon. The frictional engagement of the cord with the selected openings 71 transmits tension from the latter to the member 50, which by virtue of the linkage is thereby pulled downwardly and against the member 51, effecting a frictional grip on the portion of cord 36 between the faces 53, 63.

In this fashion tension is exerted between the supporting means, constituting the balloon, and the load 40, i. e. through the assembly of the frame 30 and member 51 attached thereto, and then via the cord 36 and member 50. The snubbing action of the selected apertures 71 on the cord provides a substantial frictional grip while permitting the cord to slide under the influence of the load 40; the structure not only retards such slippage but transfers load-force to the member 50 with the result that the latter is pulled down into gripping arrangement against the other member 51. The resulting clamping effect between the surfaces 53, 63 imparts substantial frictional resisance against the cord traveling between these members. The guiding of the cord between the members is facilitated by the threaded arrangement through the holes 72, 73, as well as by the direction of the cord through the holes 58 and 70. In addition, the weaving of the cord back and forth through the holes 70 contributes further snubbing or frictional retarding effect, in accordance with the selection of these holes.

In consequence the weight of the load is sufficient to draw the line slowly from the reel 34, but the retarding action of the described assembly particularly including the clamping effect of the members 53, 63, carries a substantial proportion of the load force and delays the advance of the line in the desired manner. The line therefore pays out, preferably very slowly, through the stated device, gradually lowering the load relative to the balloon 48, until the entire supply of cord on the reel 34 has been unwound. Thereafter, the upper end of the load line 36 is in effect directly connected to the balloon, so that the load depends at the desired, elongated position, remote from the balloon.

It will be seen that the frictional retardation and force-transmitting character of each set of grommeted holes 70, 71 may be determined, not only by the original design and arrangement of holes in a particular device, but also (where a plurality of such holes are provided) by suitable selection of the particular hole or sets of holes through which the line is threaded. For example, if the line were threaded back and forth through each of the holes 71 in succession, instead of through only the second and fourth holes in downward progression as shown, the snubbing effect would be greater at this locality and the clamping force transmitted to the members would be correspondingly increased. By the same token, a greater, supplemental snubbing effect may be obtained, for example, by threading the upper part of the line, i. e. at the tail portion 54, through the four holes in alternating succession instead of only through the upper two as illustrated.

It will also now be appreciated that the design and adjustment of the device in these and other respects can be conveniently correlated with the load and the rate of pay out desired for the line, bearing in mind that for any given set of circumstances, the snubbing effect should be insufficient to hold the line stationary, yet enough to achieve the desired delay. For example, with a device of the design as shown in Figs. 1 to 3 and having an over-all length of about 6 inches and with clamping surfaces 53, 63 about 2 inches long, loads of the order of 1 to 25 pounds may be readily handled. That is to say, employing a light, relatively thin cord of sufficient strength for the line 36, the threading of the cord through the grommeted holes 70, 71 may be preselected to afford a slow rate of line pay out, under load tensions of the magnitude just described. Assuming for example that with such a device, having the cord threaded in the manner specifically shown, and with a load of 10 pounds, the cord is payed out at a given rate (measured in feet per minute), the same device, to accomplish the same rate of pay out under a load of 20 pounds, will require the line to be threaded back and forth through more of the grommeted holes, at least for example through three or four of the holes 71.

While other snubbing and force transmitting means may be employed in association with the separable gripping members, the arrangement of holes 70, 71 is particularly convenient. Each is preferably lined or faced by a smooth, metallic grommet, applied in riveted relation as are likewise the grommets of the holes 58, 72 and 73. The snubbing of the cord around the minutely curved edges of the holes affords an effectively constant frictional effect, substantially unsusceptible of modification by wear, rusting or other change and likewise essentially incapable of tearing, abrading or otherwise injuring the cord itself. Except where the device is used for very heavy lines, such as metal cable (when milled or finely serrated surfaces 53, 63 may be used), the clamping faces 53, 63 are preferably smooth and are similarly free of any damaging or weakening effect on the cord.

Figures 9, 10, 10A:
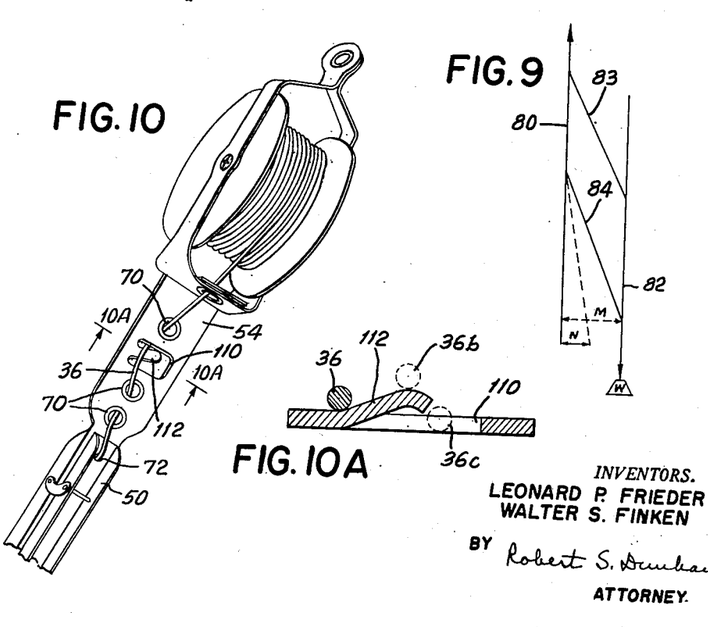

A particular advantage of the arrangement is its self-adjusting feature, relative to the thickness of the cord, viz. in that for thicker cords such as would be employed for heavier loads, the retarding force applied between the members 50, 51 is automatically increased. For instance, referring to the diagram of Fig. 9, showing certain forces understood to be applied in the linked members, the support afforded by the balloon and the upper member 51 is exerted along the line 80, while the force of the load applied to the lower member 51 is directed along the line 82. In consequence, the force of the load W, in Fig. 9, is carried between the lines 80 and 82, e. g. along the link-like lines 83, 84, in such way that there is a component of the force exerted in a horizontal direction, i. e. at right angles to the lines 80, 82. For a selected, wide opening between the members, as shown in Fig. 9, such force is indicated by the length of the perpendicular M. For a smaller opening between the members, and thus smaller separation of the lines 80, 82, the force is represented, for example, by a shorter perpendicular N. As will be seen, the value of the clamping force is thus a function (presumably varying as the sine) of the angle between the lines 83, 84 and the vertical line 80; more particularly, at least through the range of small angles at which the device normally operates, the force M or N is proportional to the distance separating the members.

In other words, since the minimum distance between the members is governed by the thickness of the cord, the frictional force exerted on the latter will depend directly on the cord diameter; where larger cords are employed to support heavier loads, the device automatically exerts a greater retarding force. To a considerable extent, a similar relationship exists between the size of the cord and the frictional snubbing action of the grommeted holes 70, 71. Thus any given embodiment of the device has great adaptability. By selecting various combinations of the grommeted holes for use, and by selecting a suitable thickness of cord, the response of the device may be adjusted over a wide range of load values and rates of retarded pay out.

The supplemental cord engaging means (such as the grommeted holes 71) not only has its own snubbing effect but also cooperates with the parallel gripping members, e. g. to control the magnitude of their frictional force on the cord. For instance, if the cord, though connected to the upper tail part 54, simply passed between the surfaces 53, 63 with no tying connection to the lower member 50, there would be no gripping action whatever; if the cord were fixedly tied to the tail part 64, maximum grip would be achieved but the cord could not move. The grommets 71 provide an intermediate condition, i. e. a slipping condition so that a part of the load force is transmitted to pull the members 50, 51 together while the cord is paying out. The gripping force thus exerted between the members is, at least within limits, dependent on the force transmitted to them from the line, and hence dependent on the amount of frictional grip or snubbing action which the selected holes 71, for instance, exert on the line. It will therefore be seen that the selection of grommeted holes, notably the number of holes 71 through which the cord is interlaced, determines the extent of frictional grip between the clamping faces 53, 63; the more the cord engages and pulls on the member 50 (by virtue of the holes 71) the more the members tend to clamp together and the greater the frictional retardation on the cord.

Figure 12:
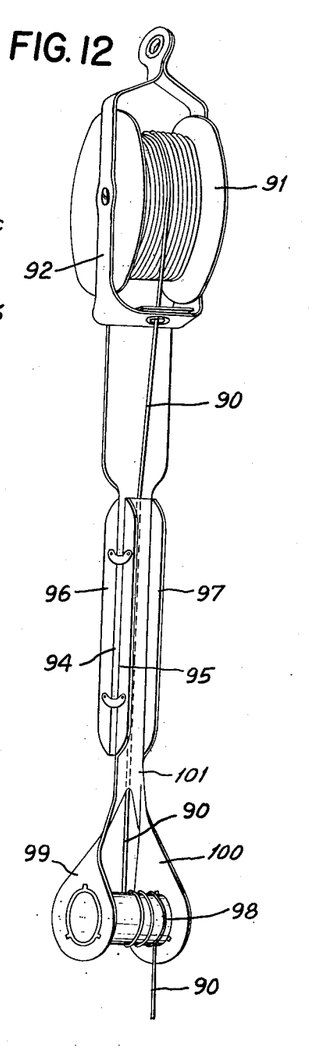
Fig. 12 is a perspective view of a further embodiment of the apparatus.

The described effect will also be apparent in the embodiment shown in Fig. 12, which although lacking certain peculiarly advantageous features of Figs. 1 to 6 represents a useful modification. Here the supply of cord 90 is carried on a like reel 91, freely rotatable in an upper frame 92 which may be secured to the balloon or like support. The cord runs down between the clamping surfaces 94, 95 of opposed, linked members 96, 97 similar to the corresponding parts in Figs. 1 to 6. Attached to the lower member 97 as an extended tail portion thereof, there is a snubbing bit or cylinder 98, constituted as a cylindrical surface disposed with its axis at right angles to the path of the cord 90. The bit or bar 98 is fixedly held, i. e. in non-rotatable fashion, by appropriate arms 99, 100 integral with the tail part 101 of the member 97. The cord 90 after traversing the space between the parallel faces 94, 95 is then given one or more turns around the bit 98 and thereafter passes downwardly for attachment to the load.

As will now be seen, the snubbing effect of the bit 98 transfers the load tension in considerable part to the members 96, 97 and pulls them together to exert retarding force on the line, the total retarding force then being the sum of that directly occasioned by the bit 98 and the controlled force between the faces 94, 95 which is itself determined by the frictional grip and corresponding tension transmitted from the bit 98. While appropriate grommeted holes, for instance to afford additional frictional resistance in the upper or tail portion of the member 96, and also to guide the cord 90 through the toe ends of the members 96, 97, may preferably be employed as shown in Figs. 1 to 6, the illustration of Fig. 12 has been simplified by omitting such elements. Although the device of Fig. 12 represents an effective structure, the embodiment of Figs. 1 to 6 is of advantage, for instance, in that it presents no extensive snubbing surface which might become tarnished or corroded (as in sea air) so as to change its frictional characteristics.

Figure 7:
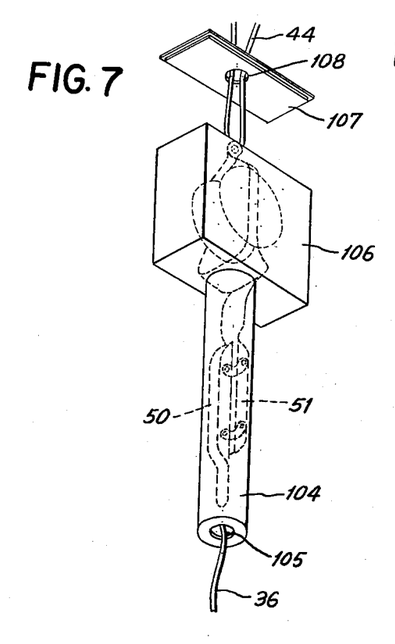
Fig. 7 is a perspective view showing one form of housing for the device of Fig. 1, with the housing cover displaced.

For practical use, the device may have a case or housing as shown in Fig. 7, for example including a long cylindrical portion 104 closed at its lower end except for an opening 105, through which the cord 36 freely passes, and an upper, box portion 106 attached to or integral with the tubular part 104. A suitably flanged or otherwise tight-fitting cover 107 may be provided to seat upon the open upper end of the portion 106, the cover having an opening 108 for free traversal of the attaching loop 44 or the like. Inserted in the housing assembly 104, 106, the parallel members 50, 51 are enclosed by the tubular part 104, and the upper frame 30 and the reel 34, by the portion 106. Fig. 8 shows the casing in closed condition with the housed apparatus in operative connection between a balloon 48 and a load 40.

It is sometimes desirable to provide a varying rate of operation, so that, for example, as the assembly rises the line pays out very slowly at first and then at an appropriate time, or if desired, gradually, accelerates the rate of load recession, i. e. to a much faster speed to attain the ultimate remote disposition of the load relative to the balloon. Among various arrangements useful to this end, Fig. 10 illustrates a simple device applied to a structure otherwise identical with Figs. 1 to 6. Here the upper, tail portion 54 of the member 51 has not only a plurality of grommeted holes 70, through which the line may be threaded enroute to the hole 72 in the toe of the other member 50, but also includes a larger aperture 110, for instance disposed between two of the holes 70. From one side of the opening 110 a tongue 112 projects upwardly and outwardly, in an angular relation, into the path of travel of the cord 36. That is to say, the tongue 112 provides an upwardly inclined bearing surface extending from one side of the path of the cord, toward a position which is aligned with such path but which there extends above the face of the strip 54, i. e. elevated or raised from the locality that the cord occupies in the simple laced arrangement of Figs. 1 to 6.

In using the apparatus of Figs. 10 and 10A, the cord is threaded through holes 70 on entering and leaving sides, so to speak, of the tongue structure and also through the opening 110 in such fashion that the cord initially takes a sidewise bend over the base of the tongue, so as to lie close to the surface of the tail piece 54, as shown in solid lines in Figs. 10 and 10A. With the cord so threaded, initial pull on it (the device being connected and operated in the manner hereinabove described for Figs. 1 to 6 and 8), a considerable frictional or snubbing effect is provided by the interlacing of the cord through the opening 70, opening 110 and further openings 70, the cord lying essentially flat against the tail piece 54. As it moves past (in paying out), continuing tension on the cord produces a component of force tending to move its bent or angular portion at the tongue 112, in a lateral or straightening direction, with the result that the cord tends to climb up on the tongue to the position 36b shown in dotted lines in Fig. 10A. As the cord reaches such position, the degree of bend or angularity created in it across the corners or edges of certain of the holes (110 and 70) is markedly decreased. The frictional or snubbing action is correspondingly lessened and the rate of advance of the cord rises.

Tests with the device of Figs. 10 and 10A have demonstrated that, presumably for the reasons just explained, the cord first pays out rather slowly, e. g. for an appreciable part of its length. Its rate of advance gradually increases, however, as it rises up to the crest or summit of the tongue (position 36b in Fig. 10A); thereafter it moves at a considerably more rapid rate, until it is completely payed out. If at any time in the latter stage of its operation, the rate of advance of the cord tends to become overly rapid, it may ride completely off the tongue, occupying the dotted line position 36c in Fig. 10A. Under such circumstances, the rate of advance will be brought down to a more moderate value, although not as slow as with the cord in the original, solid line position.

Figure 11:
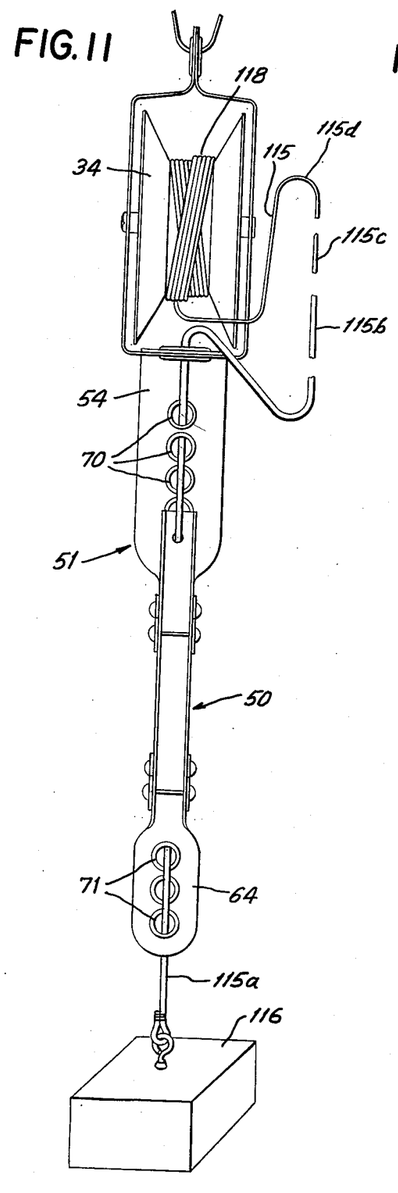
Fig. 11 is an elevation of another form of the device embodying provision for varying rate of line discharge.

A further arrangement for provision of a changing rate of advance is illustrated in Fig. 11 where the structure of the reel and associated gripping members may be assumed identical with that shown in Figs. 1 to 6. Here the cord 115 is constructed to have a non-uniform diameter, for example, such that the cord gradually tapers from one end to the other. If it is desired to have the load recede very slowly at first and then progressively at faster rates, the cord may be so woven or braided or filled or otherwise constructed that its lower end 115a, attached to the load 116, is of relatively large diameter. The diameter tapers along the length of the cord, through intermediate values indicated at 115b and 115c, to a relatively narrow or thinner dimension as indicated at 115d. It will be understood that the broken localities in the cord in Fig. 11 may represent relatively long portions of cord, all of which are wound on the reel 34 at the outset of operations. The cord is threaded through openings 70 of the upper tail piece 54, the openings in the cooperating parallel members and further openings 71 in the tail piece 64, in a manner analogous to that illustrated in Figs. 1 to 6, and such that the cord passes between the gripping faces of the members 50 and 51.

Bearing in mind, as explained above, that the extent of frictional retardation of the gripping members varies directly with the distance between them and thus directly with the diameter of the cord which separates their surfaces, it will now be seen that the arrangement of Fig. 11 provides a relatively large frictional resistance and correspondingly great retardation at the outset. As successively thinner sections of the cord pass the gripping members 50, 51, their frictional drag is correspondingly reduced and the speed of line pay out correspondingly increased, so that during the latter stages of operation the line is paying out at a considerably faster rate. It will now be appreciated that by appropriate design or configuration of the supporting cord, any desired sequence or variation of rates of pay out may be obtained. With a line of the sort illustrated in Fig. 11, it is preferable that the same be wound on the reel in a criss-cross fashion as shown at 118, so as to obviate all possibility of snagging between overlying cord portions of different diameters.

It may be noted that whereas in devices of the sort shown in Figs. 1 to 6, a cord in the form of a flat braid is at present preferred (for more effective grip of the several means engaging it), such shape is not absolutely necessary, and the drawings simply indicate, for clarity of illustration, a cord of an ordinary, round configuration.

Figures 13, 14, 15:
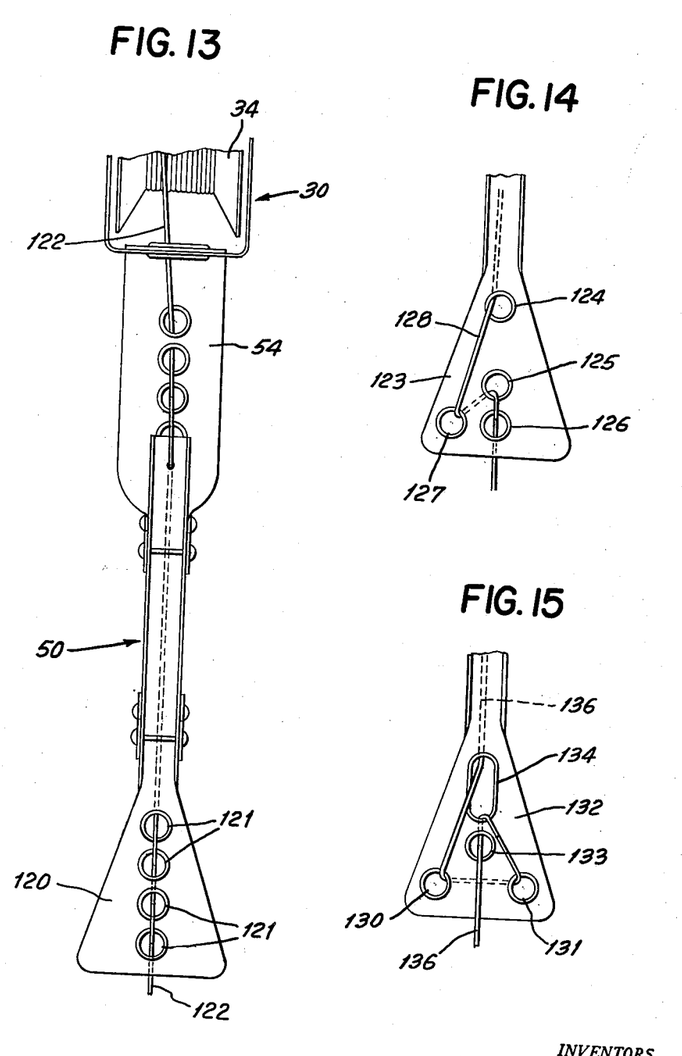
Figs. 13, 14 and 15 are elevational views respectively showing other modifications, notably in Figs. 14 and 15, of certain features of line-retarding means.

By way of further illustration of the feature of providing frictional or retarding resistance by selected threading of a cord or the like through successive eyelets or grommeted holes, Figs. 13 to 15 illustrate a variety of such arrangements of threading and disposition of holes, accomplishing markedly different values of resistance. In Fig. 13, the tail portion 120 of the member 50 in a device otherwise identical, for instance, with that shown in Figs. 1 to 6 is similarly provided with four (4) grommeted holes 121 in a straight vertical array, spaced evenly from each other by distances not more than a few times the actual diameters of the holes. Here the cord 122 is threaded through all four (4) of the holes in alternating succession, affording a maximum of snubbing effect, and consequent maximum of clamping force between the separable, parallel members, as may be possible for such arrangement of the eyelets.

In Fig. 14 the piece or bar 123 is shaped so as to accommodate three (3) holes 124, 125, and 126 in a vertical array, say with the upper pair 124, 125 more widely spaced than the lower pair, there being a further, eyeleted hole 127 disposed at one side, e. g. at the level of the lowermost hole 126. Here the cord 128 is threaded through the upper hole 124, and then extends angularly down to and through the lateral opening 127, from which it passes angularly upward in a reverse direction to the opening 125 and then in succession through the latter and the opening 126.

In the arrangement of Fig. 15, there are two laterally displaced holes, of like structure, designated 130 and 131 at opposite sides of the piece 132. There may also be other apertures such as a central, grommeted hole 133 and an elongated slot or grommeted opening 134 vertically aligned above the hole 133. In the device thus shown, the cord 136 passes down under the upper edge of the slot 134 and angularly to and through the hole 130, thence horizontally to the hole 131 and back upwardly, at an angle, to the lower edge of the slot 134. From the latter locality, the cord returns downwardly through the slot and the hole 133 below it.

It will now be seen that by modification of the arrangement of the eyeleted holes and the path of the cord, a wide variety of degrees of snubbing effect may be achieved, the arrangement of Fig. 14 providing substantially more resistance than that of Fig. 13 (which in turn afforded greater drag than the threading scheme shown in Fig. 3), and the structure illustrated in Fig. 15 providing an even greater resistance. While structures simply embodying an arrangement of eyeleted holes or the like with the line interlaced through them in a selected pattern may be employed simply, and by themselves, for retarding action on a load line or the like, it is preferred, for realization of the maximum advantages of the devices herein disclosed, that such structures be incorporated in apparatus of the sort illustrated in Figs. 1 to 6, 10 and 11, for example as in the tail piece of the lower member 50.

Figures 16, 17, 19:
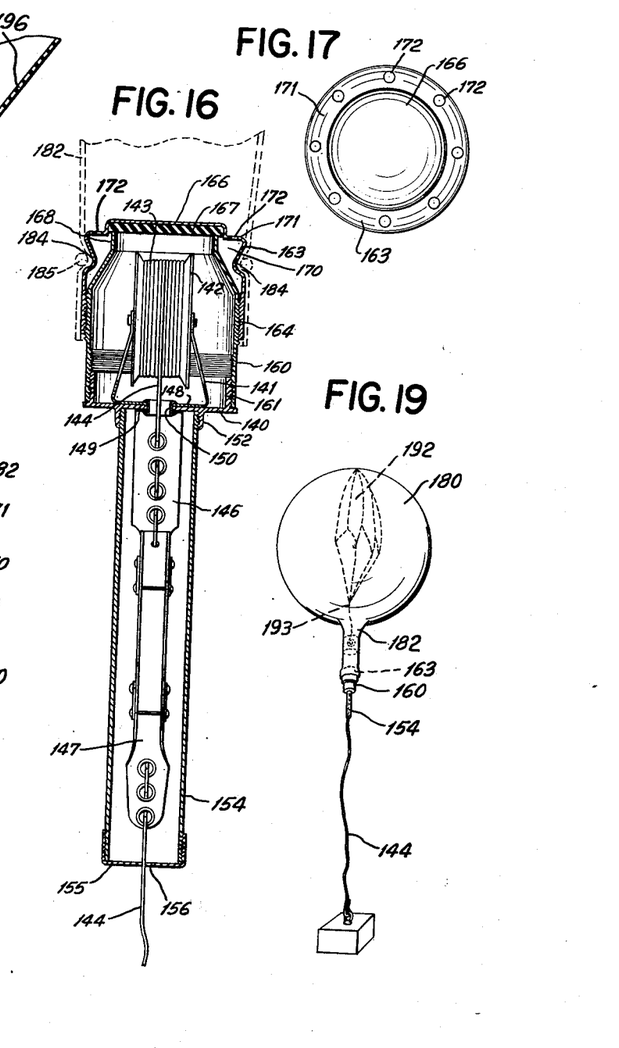
Fig. 16 is a view, chiefly in vertical section, of a combined apparatus for attachment to a balloon, including line-retarding structure and valve structure for the balloon.
Fig. 17 is a plan view of the device of Fig. 16.
Fig. 19 is a schematic, perspective view showing the device of Figs. 16 and 17 in combination with the balloon and supported load, as in use.

Figs. 16 to 19, inclusive, illustrate a further and particularly advantageous embodiment of the invention, affording a complete closure and mounting device for a balloon, and cooperatively including means for retarded release of the load line, immediately associated with the mounting structure and in effect with the balloon itself. As shown in Fig. 16, this device includes a circular base member 140 carrying on its upper surface a yoke 141 constituting a bearing and support for the reel 142 on which is wound the supply 143 of the load line 144. An upper member 147, 146 which cooperates with a lower member 147 to provide a pair of linked retarding members essentially the same as the elements 50 and 51 in Figs. 1 to 6, is also secured to the base element 140. Conveniently the transverse portion 148 of the yoke 141 and the horizontal flange 149 of the member 146 are held to the base 140 by a grommet or eyelet 150, compressed rivet-like in place as in the case of similar fastenings in other embodiments.

The base 140 has a depending skirt 152 which is internally threaded to receive the upper threaded end of a long cylindrical case 154 that encloses the members 146, 147 and is in turn closed at its lower end by a threaded cap 155, the cord 144 freely traversing an opening 156 in the cap. A generally cylindrical housing 160 is removably secured at the upper side of the base 140, for example by threaded engagement between the inner surface of the housing and the outer surface of a cylindrical flange 161 rising near the periphery of the member 140. A skirted cap 163 is displaceably secured over the upper end of the housing 160, e. g. by means of threads on the inner surface of the cap skirt cooperating at 164 with corresponding threads on an upper part of the housing 160.

The upper surface of the cap 163 is upwardly recessed over a central and considerable region at 166 to receive an inner, closure disk 167 of rubber or like compressible material, which can be firmly abutted on the upper edge of a neck portion 168, of reduced diameter, at the top of the housing 160, the latter device tapering upwardly to the neck portion 168 as shown, so that an annular space 170 is provided within the cap 163 and outside of the housing, i. e. beneath the outermost section 171 of the cap face. The cap portion 171 is apertured to afford free communication between the space 170 and the region above the cap, such apertures preferably consisting of a multiplicity of holes 172 spaced circumferentially around the region 171 as shown. By providing a plurality of such holes, danger of inadvertently closing one or another of them by the balloon fabric during the filling or other operation hereinbelow described is rendered of no consequence.

It will now be seen that the structure described constitutes a protective enclosure not only for the members 146, 147 but also for the reel 142 and its mounting, such enclosure being adapted as will now be described, for direct mounting within the structure of a balloon or the like and cooperating further to facilitate assembly and filling of the balloon at the time of use. As will be understood, a common type of balloon used for meteorological soundings and the like comprises a spherical body 180 (Fig. 19) of thin, elastic material such as rubber or a synthetic substance, having a tubular neck 182 strongly and integrally associated with the body of the balloon and customarily employed for filling the balloon with the desired, light gas. In ordinary practice heretofore, the filling connection is inserted in the mouth or neck 182, and after the balloon is filled, the neck is folded and flattened upon itself one or more times and finely tied, to prevent escape of gas, e. g. as shown at 183 in Fig. 8.

Figure 18:
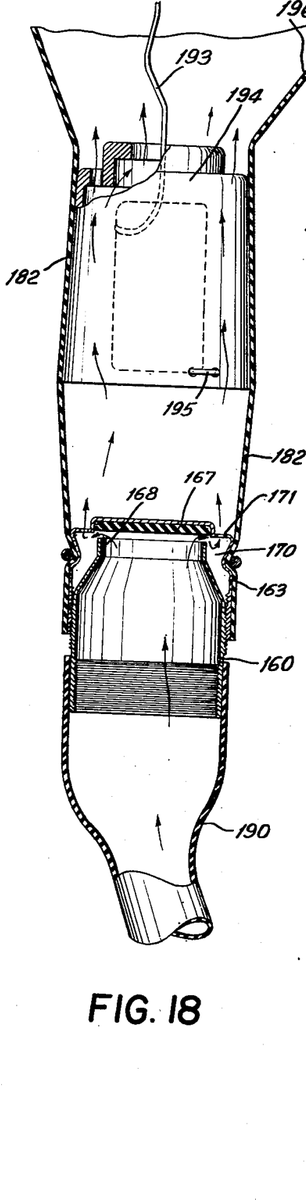
Fig. 18 is a view, chiefly in vertical section, showing certain parts of the device of Fig. 16, and associated instrumentalities, in the course of original attachment to a balloon.

As will be seen in Figs. 16, 18 and 19, the device including the cap 163 and housing 160, is adapted to be inserted snugly in the tubular neck 182 of the balloon, the cap 163 having a peripheral groove or corrugation 184 against which the tubular fabric 182 of the balloon may be pressed by an outer ring, tight cord, or other encircling member 185, i. e. so that the tube 182 is securely fastened, in sealed relation, to the outer surface of the skirt of the cap. As originally packed for storage, shipment and the like, the entire assembly may be secured together in the tube 182, e. g. as shown in Fig. 16. When it is desired to fill and use the balloon, the lower plate 140 is unscrewed from the housing member 160 and the retarding assembly carried by the plate is thus temporarily removed. The housing 160 itself is then partly unscrewed in the skirt of the cap 163, i. e. so that the upper edge of the neck 168 is backed away from and clear of the sealing disk 167, as shown in Fig. 18.

A flexible conduit 190 is pushed over the exposed end of the housing member 160, i. e. as shown in Fig. 18, so as to fit snugly thereon. The conduit 190 may extend to a source of suitable gas under pressure (not shown) from which it is desired to fill the balloon. Thereupon gas is supplied to the balloon, traveling in the path of the arrows, through the conduit 190, the housing 160 and the space between the mouth 168 and the sealing disk 167, the valve constituted by these parts being now open. Thence the gas travels through the annular chamber 170 and the openings 171 to the upper part of the tubular neck 182 and the interior of the balloon. When the balloon is filled to the desired extent and thus expanded in the manner intended, the supply of gas may be turned off (by means not shown) at the source. The member 160, conveniently grasped by holding the outer surface of the conduit 190, is turned sufficiently to screw it back into the cap 163 until the mouth 168 firmly and fully engages the sealing disk 167 in closed, gastight relation. With the valve thus closed, the conduit 190 may be removed and the supporting member 140 then reinserted in the lower opening of the housing 160, i. e. by screwing such member back tightly into place so that the reel 142 is again enclosed by the member 160 and the parts are securely associated together.

Desirable rapidity in the operation of filling the balloon and closing the valve is facilitated if the member 160 is originally backed away from the disk 167 by no more than enough to provide the desired inflow of gas through the valve structure, for example by unscrewing the member 160 four or five turns.

The balloon, by the few simple operations just described, is completely filled and sealed, while the attached load, together with the described line-receding structure, is securely fastened for carriage aloft by the balloon. No further operations are required with respect to the filling of the balloon or the connection, adjustment and setting of the load line. The balloon may thereupon be released, carrying the load upward as shown in Fig. 19, while the members 146, 147 immediately come into play to pay out the line at the appropriate slow rate as described in connection with the other embodiments above.

It will be appreciated that other devices may be associated with the balloon as heretofore known, for example including a light, normally collapsed parachute 192 suspended within the balloon and having a load line 193 releasably collected in a cylindrical holder 194 mounted in the neck 182, above the assembly 160-163. The structure 194 includes, as shown, sufficient apertures at its upper and lower ends and corresponding passage space, so that the gas entering the balloon may travel freely through such structure. It will be understood that the remote end 195 of the collected cord 193 is secured to the device 194, the assembly being such that when and if the balloon 180 bursts at a high altitude, preferably in such manner as to sever the major part of the spherical balloon fabric from a portion 196 adjacent the neck 182, the parachute 192 will deploy, paying out its load line 193 as necessary and then supporting the device 194, the balloon neck 182 attached thereto and all of the structure also carried by the neck, including the retarding assembly as stated, the load line 144 and the load itself. Thus all of the balloon-carried parts, particularly including the valuable instruments constituting the load, may be brought slowly and safely to earth by the parachute.

It will be seen that the structure illustrated in Figs. 16 to 19 thus constitutes a peculiarly advantageous combination of cooperating elements for mounting the load line device in the neck of the balloon and for facilitating filling and assembly of the balloon at the time of use. The several housing and supporting elements 160, 163, 154 and the like may be of simple and inexpensive construction, being made of relatively thin aluminum or like metal, spun, pressed or otherwise formed to the described shapes.

Line-retarding means of the character disclosed hereinabove, for example embodying the fundamental type of structure shown in Figs. 1 to 6 inclusive, may be applied to other uses, in connection not only with balloons but also with other structures or devices from which a load is to be suspended or payed out. Thus, for example, the apparatus may be employed as a shock absorber in the load line connections of a parachute, the pay out of the load line under frictional retardation serving to reduce greatly the shock of parachute opening, it being understood that for such purpose the parachute is attached to the loop 44, and the load to the line 36a.

The device may, in all of these and other cases also include supplemental instrumentalities, for delayed operation of associated means under control of the load line release. For instance, in the case of certain aerially borne or projected devices, wherein a parachute is to be released or other apparatus operated at a delayed time, the mechanism may include means for bringing such parachute or other apparatus into play upon completion of pay out of the load line. Thus certain aerially introduced equipment may be such that upon a predetermined occasion a load line and load may be discharged from an aerial device which is traveling rapidly in a non-downward direction. Under such circumstances the retarding means serves to absorb the shock of load line release, while at the end, say, of load line extension supplemental structure is actuated to release a parachute or similar instrumentality.

Figure 20:
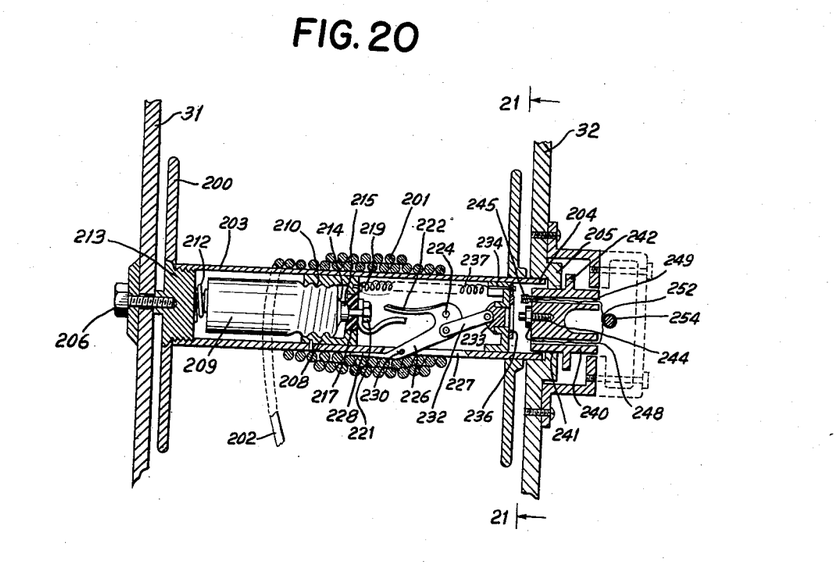
Fig. 20 is a vertical section of an alternative structure embodied in devices of the sort shown in Figs. 1, 10, 11, 12, 13, and 16, including a supplemental control feature.
Figure 21:
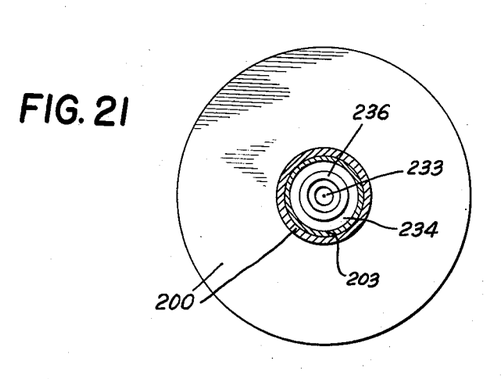
Fig. 21 is a section on line 21—21 of Fig. 20.

One example of supplemental means to the above end is shown in Figs. 20 and 21, it being understood that these views illustrate a fragment of an assembly which may in its other parts assume any one of the forms illustrated elsewhere herein. Thus in the greatly enlarged view of Figs. 20 and 21, the members 31, 32 may be the same as members similarly identified in Figs. 1 and 3, for the rotatable support of a reel 200 upon which a supply 201 of a load line 202 is wound.

In this arrangement, the central drum or supporting cylinder 203 of the reel consists of a hollow tube as shown, which has an end 204 projecting beyond one end of the reel and rotatably seated in a recess 205 appropriately deformed in the member 32. The other end of the reel is carried by bearing structure 206, so that the reel is freely rotatable in the members 31, 32. Inside the central tube 203 of the reel or spool, an internally threaded socket or cap 208 holds the head of an electric cell 209, such as a dry cell or other electric battery, the cell having threads 210 about its neck by which it is screwed into the cap 208. A supplemental spring 212, under compression between the end of the battery and the closure 213 at the end of the tube 203 cooperates to prevent loosening of the cell by vibration. The usual central terminal 214 of the head of the cell is engaged, i. e. in electrical contact, by a contact member 215 mounted in an insulating bushing 217 in the cap 208, while electrical connection to the case, constituting the other terminal of the battery, is effected through the metallic cap 208 to a pin or lug 219 therein.

A metal arm 220 projects axially from a stud 221 which holds the contact 215, and is arranged to cooperate with a similar arm or strip 222 pivotally mounted at 224 to the inside of the tube 203 (so as to rock about a pivot axis perpendicular to the plane of view of Fig. 20), such rocking assembly having another arm 226 projecting through an opening 227 in the wall of the tube 203. The arm 226 has an extension or finger 228 adapted to overlie the periphery of the tube 203 and to be held against the latter by the winding of cord 202. The inner end of the line is secured at 230 to the arm 226, so that while the contacts constituted by the arms 220—222 are normally open when the winding holds the finger 228 against the tube 203, a complete release of the cord, with the load upon it, will rock the arm 226 downwardly, bringing the contacts 222—220 into closed position.

Eccentrically of the pivot 224, the assembly 222—226 is linked by a member 232 to a contact block 233 mounted at the center of a piston 234 which is made of insulating material and which is fitted to slide in the tube 203. On its outer face the piston 234 carries a metal contact ring 236, electrically connected by a flexible conductor 237 to the lug 219. A second piston or plug 240, conveniently of insulating material, projects through an opening 241 in the member 32 which is aligned with the axis of the tube 203. If desired, the piston 240 may be adapted to slide outwardly, i. e. to the right as seen in Fig. 20, but is held against further inward displacement, by its flange 242.

The inwardly facing end of the piston 240 carries a central contact pin or stud 244 disposed to be engaged by the block 233, and a side contact pin 245 adapted to abut the ring 236. That is to say, the structure is normally disposed in the relation shown, with the contacts 233, 244 and 236, 245 separated and open. When the line cord 202 pulls down the arm 226, closing the contacts 220—222, the pivoted link 232 also advances the piston 234, i. e. to the right as shown, forcing the block 233 and ring 236 respectively against and in electrical contact with the stud 234 and the pin 245.

Thus completion of pay out of the line 202 effectuates closure of an electrical circuit between the cell 209 and the contact members 244, 245, supplying voltage and current to the latter. By virtue of the displaceable nature of the piston 234, the circuit is not only kept open until the desired moment, but undesired resistance or other mishap in the electrical circuit is avoided, i. e. such as might occur were it attempted to have a wiping contact between the fixed frame and the rotatable reel assembly. Likewise, undesired and irregular drag on the reel is similarly avoided, yet effective contact is achieved, under the strong yet resilient pull of the load on the arm 226. Normally open contacts 220—222 provide an additional feature of safety to keep the circuit open and particularly to avoid accidental discharge of the battery or other undesirable consequence, as in initial assembly of the device.

It will be appreciated that the leads 248, 249 respectively extending through the member 240 and the outer pin 245 from the central pin 244 may be connected to any suitable device to be electrically controlled or actuated by connection with a source of current or voltage. For example, in the specific device shown, the leads 248, 249 are connected together at 252 by an appropriate wire or the like of suitable resistance which is looped around a cord member 254 illustrated in cross section as disposed adjacent a recess in the end of the member 240, provided to minimize conduction of heat from the wire. Assuming for instance that the cord 254 constitutes the release cord of a parachute (not shown) in an apparatus of the character described above, the wire 252 may thus be such that when connected to the source of current 209 it heats rapidly to a high temperature, burning through the cord 254 and severing the same for release of the parachute or like equipment.

The operation of the device shown in Figs. 20 and 21 is essentially self-evident from the foregoing, in that with the parts assembled as shown and with the supply 201 of cord 202 wound on the spool, the arrangement is ready for use. During release of the cord 202, it unwinds from the spool, the latter turning freely without effect on the contained instrumentalities. When the cord is fully unwound, the force of its load rocks the then releasable lever structure 222—226, closing the contacts 220—222 and likewise displacing the piston 234 to the right for electrical energization of the leads 248—249. Thereupon the desired electrical control is effected, as by weakening and severing the parachute release cord 254 so that the parachute (not shown), packed in a customary manner for response to breakage of such a cord, may be discharged and deployed.

It will now be seen that the various forms of the apparatus disclosed herein embody new and effective combinations of instrumentalities for connection and control of objects to be held or carried by a load line, and particularly including means for regulated release of the line in a desired manner. In all embodiments, the structure is essentially simple and inexpensive to manufacture, yet sturdy and capable of reliable operation to perform the stated tasks. Furthermore, the line-retarding instrumentalities are susceptible of ready adjustment, both by pre-setting to suit desired conditions of load force and rate of line extension, and to provide automatic accommodation or response to certain conditions, such as the extent of the load, and particularly the character, e. g. thickness, of the load line.

It is to be understood that the invention is not limited to the specific structures herein shown and described but may be embodied in other forms without departure from its spirit.

We claim:

1. Apparatus for extendibly connecting a load support and a load with a line which is to be retarded as it extends, comprising connecting means carrying a releasable supply of line, said line and connecting means being arranged for connection in series between the load support and the load, a pair of elongated, parallel members movable relative to each other and adapted to receive the line between them as it extends in said series connection, said members being adapted to move into position for frictionally retarding grip on the line when one is tensioned relative to the other, said members having linking means connecting them to maintain said members in parallel relation through all positions of movement toward each other, one of said members being attached to the first-mentioned connecting means and the other of said members including means frictionally engaging the line for mutually tensioning the members under and in proportion to the part of the force of the load which is transmitted to said other member by said frictional engagement.

2. Apparatus for retarding advance of a line under load, comprising gripping means adapted to receive the line and shiftable in response to load force to exert a frictional, retarding grip on the line, and means associated with said gripping means and slidably engaging the line in frictional contact therewith, for applying a part of the force of the load to said gripping means, to cause exertion of frictional grip by the latter on the line, said gripping means comprising a pair of members having parallel, opposed faces adapted to engage the line between them, said faces extending lengthwise of the path of the line between them, and a pair of linkage means each extending between the members and mutually spaced lengthwise of the members for movement of said members toward and away from each other in parallel relation to each other, and said means for applying load force comprising means connected to said gripping means for drawing the members together under said applied part of the load force.

3. Apparatus for retarding advance of a line under load, comprising members having parallel, opposed, elongated, straight-line faces adapted to engage a line between them, means linking said members to move toward and away from each other, said means comprising links between the members spaced lengthwise thereof to constitute parallelogram linkage of the members, and means for applying force to said members from a line moving between them, to shift the members into frictional, retarding grip on said line, said means including means associated with at least one of the members and slidably engaging the line in frictional contact therewith, for applying part of the line load to said last-mentioned member.

4. Apparatus for extendibly connecting a load support and a load with a line which is to be retarded as it extends, comprising connecting means carrying a releasable supply of line, said line and connecting means being arranged for connection in series between the load support and the load, a pair of elongated, parallel members adapted to receive the line between them as it extends in said series connection, said members being linked for motion toward and away from line-gripping position, and being adapted to move into gripping position when one member is tensioned relative to the other, said members having linking means between them, comprising links spaced lengthwise of the members to constitute parallelogram linkage of the members, one of said members being attached to the first-mentioned connecting means and the other of said members including means slidably engaging the line in frictional contact therewith for applying part of the load force to tension said other member relative to the first.

5. Apparatus as described in claim 4, wherein the first-mentioned member includes means disposed intermediate the same and the line supply, for slidably engaging the line in frictional contact therewith, to exert supplemental frictional drag on the line as it is pulled through the first-mentioned line-engaging means and between the parallel members under force of the load.

6. Apparatus for extendibly connecting a load support and a load with a line which is to be retarded as it extends, comprising a supporting structure having a rotatable reel mounted thereon, a length of line wound on said reel and having its inner end connected thereto, said supporting structure and the outer end of said line being adapted for connection between the load support and the load to support the load by the line when the same is payed out from the reel, a pair of elongated, parallel, straight-line gripping members disposed for passage of the line between them as it extends from the reel and having means movably linking said members to exert frictional drag on the line when one member is tensioned relative to the other, said linking means comprising means maintaining said members in parallel relation throughout mutual movement of said members toward each other into frictional engagement with the line, one of said members being attached to the first-mentioned structure and the other of said members including means slidably engaging the line in frictional contact therewith, to apply part of the load force in tensioning said other member relative to the first while the line is payed out from the reel under the force of the load relative to the support.

7. Apparatus for retarding advance of a line under load, comprising a pair of elongated members having parallel, opposed faces, adapted to grip a line passing lengthwise between them, parallelogram linkage means connecting said members together, to move the same into line-gripping position upon application of force on one member relative to the other, each of said members having a line-engaging structure extending longitudinally therefrom beyond one end of its gripping face, said structure of each member extending in an opposite direction from that of the other, each said line-engaging structure including means for exerting frictional drag on a line moving through the members and for guiding said line into longitudinal relation with the members, and each of said members having an extremity provided with line guiding means adjacent the aforesaid structure of the other member, arranged so that the line passes through said guiding means intermediate the aforesaid adjacent structure and the line-gripping region between the members.

8. Apparatus as described in claim 7, wherein each of said line-gripping structures comprises an arm extending longitudinally from the associated member, said arm having a plurality of grommeted holes through which the line may be threaded for frictional engagement with the sides of said holes.

9. Apparatus as described in claim 3, wherein the guiding means at the extremity of each member comprises a grommeted hole through which the line passes between the grommeted holes of the adjacent structure and the space between the members, whereby the line is aligned in said space as it is drawn from the said hole at the extremity of one member to the like hole at the extremity at the other.

10. In apparatus of the character described, in combination, load line supply means adapted for advance of a load line therefrom, separable gripping means disposed for passage of the load line through the same between the supply means and the load, said gripping means being engageable in frictional contact with the load line upon application of force thereto, and supplemental means associated with the gripping means and frictionally engaging the load line for transmitting load force to the separable means to bring the same into engagement, said separable gripping means comprising a pair of members having opposed, elongated, parallel, straight-line faces adapted to engage the line passing lengthwise between them, and means linking the members to be drawn toward each other upon application of load force by the aforesaid supplemental means, said linking means comprising means maintaining the members in parallel relation through all positions of movement toward each other.

11. In apparatus of the character described, in combination, a reel carrying a supply of load line, means rotatably supporting said reel, a pair of gripping members having gripping surfaces disposed for passage of the load line between them, linkage means connecting said members to maintain said surfaces parallel in all positions relative to one another, said surfaces being effective as said members approach one another to move into frictional engagement with said line, one of said members being secured to the reel mounting means and the other of said members having an associated element provided with a plurality of apertures through which the load line is interwoven intermediate the gripping members and the load, said element thereby engaging the load line at the edges of said apertures for frictional grip thereon to transmit member-shifting force to the members.

12. In apparatus of the character described, in combination, a reel carrying a supply of load line, means rotatably supporting said reel, a pair of gripping members having gripping surfaces disposed for passage of the load line between them, linkage means connecting said members to maintain said surfaces parallel in all positions relative to one another, said surfaces being effective as said members approach one another to move into frictional engagement with said line, one of said members being secured to the reel mounting means and the other of said members including means adapted to engage the load line for applying load force to the members to move them into gripping relation, said first-mentioned member including supplemental gripping means adapted to engage the line intermediate the reel and the members, said supplemental means comprising a device responsive to travel of the load line through the same for imparting frictional retardation on said line which varies in predetermined manner as the line advances.

13. In apparatus of the character described, in combination, a reel carrying a supply of load line, means rotatably supporting said reel, a pair of gripping members having gripping surfaces disposed for passage of the load line between them, linkage means connecting said members to maintain said surfaces parallel in all positions relative to one another, said surfaces being effective as said members approach one another to move into frictional engagement with said line, one of said members being secured to the reel mounting means and the other of said members including means responsive to advance of the line for moving the members into gripping relation, and said first-mentioned member including supplemental means traversable by the line intermediate the load and the members for frictionally retarding the line, said supplemental means including line-engaging edge structures and a line supporting element disposed in angular relation to the path of the line, said line supporting element having a surface traversable by the line and disposed in said angular relation so that the line, by its motion, moves its path laterally with respect to said surface, said element being shaped, relative to said edge structures, for modification of the frictional retardation of the edge structures when the line is displaced laterally as aforesaid.

14. In apparatus of the character described, in combination, a reel carrying a supply of load line, means rotatably supporting said reel, a pair of gripping members having gripping surfaces disposed for passage of the load line between them, linkage means connecting said members to maintain said surfaces parallel in all positions relative to one another, said surfaces being effective as said members approach one another to move into frictional engagement with said line, one of said members being secured to the reel mounting means and the other of said members having means engaging the line, and responsive to the load force, for moving the members into line gripping relation, said first-mentioned member including an extended portion having a pair of apertures through which the line is interlaced in its path between the reel and the members, the edges of said apertures providing frictional retardation of the line and said supplemental portion including a tongue element extending angularly therefrom between the apertures and across the path of the line, said tongue element being adapted for passage of the line thereover and being shaped so that the line, by its own motion, will be displaced laterally in its path across said tongue structure from a locality of predetermined resistance with the edges of the apertures, to a locality supporting the line with less pressure against the said edges, for reduced frictional engagement.

15. In apparatus of the character described, in combination, a reel carrying a supply of load line, means rotatably supporting said reel, a pair of gripping members having gripping surfaces disposed for passage of the load line between them, linkage means connecting said members to maintain said surfaces parallel in all positions relative to one another, said surfaces being effective as said members approach one another to move into frictional engagement with said line, one of said members being secured to the reel mounting means and the other of said members having an associated plate structure extending therefrom, said plate structure having a plurality of apertures aligned in the path of the load line between the members and the load, and having at least one other aperture disposed at a side of said path, said load line being interwoven through the first-mentioned plurality of apertures and through said other aperture along a circuitous path which at least partly doubles back on itself, said plate structure thereby exerting frictional engagement on the line at the edges of said apertures to transmit load force to the associated member for moving the members into gripping relation.

16. The apparatus of claim 15, wherein the plate structure comprises a pair of apertures aligned in the path of the load line between the members and the load, and has another aperture, additional to the aforesaid other aperture, disposed at the other side of said path, said load line being interwoven through all of said apertures in succession, such that between the members and the load it travels in series through one of the aligned apertures, then the first of the side apertures, then the second of the side apertures and finally back through the aligned apertures.

17. The apparatus of claim 15, wherein the plate structure comprises, a rigid plate having a multiplicity of grommeted holes arranged in spaced relation, for passage of cord in back and forth relation through them, to effect frictional retarding force on said line at the edges of said holes when the line is advanced, under load, in the plane of the plate.

18. The apparatus of claim 15, wherein the plate structure has another side aperture, additional to the aforesaid other aperture, disposed at the other side of said path, said load line being interwoven through all of said apertures in succession, such that between its support and the load it travels in series through one of the aligned apertures, then the first of the side apertures, then the second of the side apertures and finally back through the aligned apertures.

19. In apparatus of the character described, in combination, a rotatable reel carrying a supply of line to be payed-out, a pair of members having gripping surfaces disposed for passage of said line between them, linkage means connecting said members to maintain said surfaces parallel in all positions relative to one another, said surfaces being effective as said members approach one another to move into frictional gripping relation on the line in response to force of one of said members relative to the other, means connecting the said other of the members with the reel, means engaging the said load line for applying load force to the first of the members to urge them into frictional gripping relation to the line, and means controlled by the reel and adapted to be engaged by the line in response to load force when the line is fully extended from the reel, for effecting a control operation.

20. In apparatus of the character described, in combination, a reel carrying a supply of load line wound thereon, a pair of clamping members having gripping surfaces adapted to receive the line between them, linkage means connecting said members to maintain said surfaces parallel in all positions relative to one another, said surfaces being effective as said members approach one another to move into frictional engagement with the line upon the exertion of force upon one member relative to the other, one of said members being connected with the reel and the other of said means including means engaging the line for applying load force to shift the members into gripping relation, said reel having a hollow hub provided with an opening at one side thereof, a member pivotally mounted in the hub and having an arm extending through said opening, said arm being adapted to be secured to the inner end of the load line which is wound on the reel and to be held in a predetermined, first position by the winding of line, said pivoted member being adapted to rock to another position under the load force of the line when the line is unwound, and electrical circuit controlling means actuated by said member in response to displacement from its first to its other position.

21. The apparatus of claim 20, in which the reel hub includes a piston slidably mounted therein, and which also includes means linking said piston to the displaceable member, means stationary with respect to the reel and carrying contact means in the path of said piston, and contact means carried by the piston and adapted to engage the first-mentioned contact means upon the aforesaid displacement of the member.

22. The apparatus of claim 21 in which the hub also includes means for holding electric cell means therein, conductor structure associated with said cell-holding means and adapted to extend to the contact means carried by the piston, said displaceable member including a contact arm adapted to be rocked therewith, said conductor structure including a second contact arm disposed in the path of the first-mentioned arm to be engaged thereby when the displaceable member is rocked from its first to its aforesaid other position, said displaceable member and connecting link effecting electrical connection between the contact arms and the contact means of the piston.

23. Apparatus for extendibly connecting a load support and a load with a line which is to be retarded as it extends, comprising connecting means carrying a releasable supply of line, said line and connecting means being arranged for connection in series between the load support and the load, a pair of elongated, parallel members movable relative to each other and adapted to receive the line between them as it extends in said series connection, said members being adapted to move into position for frictionally retarding grip on the line when one is tensioned relative to the other, said members having linking means connecting them to maintain said members in parallel relation through all positions of movement toward each other, one of said members being attached to the first-mentioned connecting means and the other of said members including means engaging the line for mutually tensioning the members under and in proportion to the part of the force of the load which is transmitted to said other member by said line-engaging means, said last-mentioned line-engaging means comprising a bit non-rotatably carried by said other member and having a curved surface about which the line is wrapped through at least a full turn for frictional engagement permitting slippage of the line under force of the load.

24. Apparatus for retarding advance of a line under load, comprising a pair of parallel members linked for motion between open and closed positions and adapted to move toward closed position when one is tensioned relative to the other, said members being adapted to receive a loaded line between them to exert frictional drag thereon when in closed position, one of said members being adapted for connection to a load carrying means and the other member including non-rotatable bit means about which the line is wrapped through at least a full turn said bit means slidably engaging the line in frictional contact therewith, for applying part of the load force to tension said other member relative to the first, said members having elongated, opposed, line-engaging faces parallel to each other and having a straight line configuration parallel to the path of the line between them, said members having linkage joining them for displacement to said closed position upon movement of said other member relative to the first in the direction of said line path and said other member being movable in said direction upon being tensioned by said load force of the line.

25. Apparatus for retarding advance of a line under load, comprising members having parallel, opposed faces adapted to engage a line between them, means linking said members to move toward and away from each other, and associated line-engaging means for applying force to said members from a line moving between them, to shift the members into frictional, retarding grip on said line, said linking means comprising parallelogram linkage means maintaining said members in parallel relation through all positions of movement toward and away from each other.

26. Apparatus for retarding advance of a line under load, comprising a pair of parallel members linked for motion between open and closed positions and adapted to move toward closed position when one is tensioned relative to the other, said members being adapted to receive a loaded line between them to exert frictional drag thereon when in closed position, one of said members being adapted for connection to a load carrying means and the other member including means slidably engaging the line in frictional contact therewith, for applying part of the load force to tension said other member relative to the first, said members having elongated, opposed, line-engaging faces parallel to each other and having a straight line configuration parallel to the path of the line between them, said members having parallelogram linkage joining them for displacement to said closed position upon movement of said other member relative to the first in the direction of said line path and said other member being movable in said direction upon being tensioned by said load force of the line.

References Cited in the file of this patent

UNITED STATES PATENTS

| Number | Name | Date |
| --- | --- | --- |
| 642,889 | Whitner | Feb. 6, 1900 |
| 1,158,952 | Amman | Nov. 2, 1915 |
| 1,198,926 | Kemp | Sept. 19, 1916 |
| 1,216,041 | Abramson | Feb. 13, 1917 |
| 2,085,319 | Kolstedt | June 29, 1937 |
| 2,254,255 | Zeruneith | Sept. 2, 1941 |
| 2,415,818 | Frieder et al. | Feb. 18, 1947 |
| 2,417,818 | Finn | Mar. 25, 1947 |
| 2,444,642 | Frieder et al. | July 6, 1948 |
| 2,451,662 | Cook | Oct. 19, 1948 |

FOREIGN PATENTS

| Number | Country | Date |
| --- | --- | --- |
| 6,421 | Great Britain | Apr. 2, 1892 |
| 53,206 | Switzerland | July 22, 1911 |
| 468,657 | France | Apr. 29, 1914 |